United States Patent
Ghosh et al.

(10) Patent No.: US 11,579,769 B1
(45) Date of Patent: Feb. 14, 2023

(54) GRAPHIC DEVICE FOR CONTROLLING DISPLAYED OBJECT MOVEMENT AND/OR SCREEN SCROLLING

(71) Applicant: International Business Machines Corporation, Armonk, NY (US)

(72) Inventors: Partho Ghosh, Kolkata (IN); Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/644,168

(22) Filed: Dec. 14, 2021

(51) Int. Cl.
*G06F 3/04886* (2022.01)
*G06F 3/04845* (2022.01)
*G06F 3/04847* (2022.01)

(52) U.S. Cl.
CPC ...... *G06F 3/04886* (2013.01); *G06F 3/04845* (2013.01); *G06F 3/04847* (2013.01)

(58) Field of Classification Search
CPC ......... G06F 2203/04802; G06F 3/0485; G06F 3/04886; G06F 3/04845; G06F 3/04847
See application file for complete search history.

(56) References Cited

U.S. PATENT DOCUMENTS

| | | | | |
|---|---|---|---|---|
| 5,452,413 A | * | 9/1995 | Blades | G06F 3/04845 715/833 |
| 6,922,816 B1 | * | 7/2005 | Amin | G06F 3/04847 715/833 |
| 7,398,477 B2 | | 7/2008 | Accot | |
| 7,735,019 B2 | | 6/2010 | Firebaugh | |
| D623,657 S | * | 9/2010 | Fitzmaurice | D14/488 |
| 9,058,073 B2 | * | 6/2015 | Fujibayashi | G06F 3/04847 |
| 9,231,775 B2 | * | 1/2016 | Bozionek | H04L 12/1818 |
| 9,740,306 B1 | * | 8/2017 | Buchheit | G06F 3/0485 |
| 9,934,488 B2 | * | 4/2018 | Glueck | G06Q 10/10 |
| 10,007,933 B2 | | 6/2018 | Simeonov | |
| 10,318,127 B2 | * | 6/2019 | Shin | G06F 3/04883 |
| 10,782,819 B1 | | 9/2020 | Smith | |
| 10,969,876 B1 | * | 4/2021 | Michaels | G06F 3/017 |
| 10,984,606 B1 | * | 4/2021 | Dalmia | G06T 19/20 |
| 11,170,582 B1 | * | 11/2021 | McNeil | G06F 3/0483 |

(Continued)

OTHER PUBLICATIONS

Disclosed Anonymously, et al., "Context-Aware Indexed Scroll Bars and Navigators", ip.com Prior Art Database Technical Disclosure, IP.com No. IPCOM000219404D, Jun. 27, 2012, 7 pgs., <https://priorart.ip.com/IPCOM/000219404>.

(Continued)

*Primary Examiner* — Ryan F Pitaro
(74) *Attorney, Agent, or Firm* — David B. Woycechowsky

(57) ABSTRACT

A graphic device for computer displays (for example, touchscreen style computer displays) with multiple independently operable active areas, each of which can be operated to change a different dimensions. In some embodiments, the dimensions correspond to spatial dimensions in which a selected object in the display can be moved. In some embodiments, the dimensions correspond to spatial dimensions in which the display can be scrolled. In some embodiments, the dimensions correspond to actions performed on real world devices and/or objects (for example, motions of a remote control aerial vehicle, operations of an Internet of Things type video monitor).

15 Claims, 16 Drawing Sheets

(56) References Cited

U.S. PATENT DOCUMENTS

| | | | |
|---|---|---|---|
| 2004/0164957 A1* | 8/2004 | Yamaguchi | G06T 19/20 345/156 |
| 2007/0192744 A1* | 8/2007 | Reponen | G06F 3/03548 715/833 |
| 2007/0206030 A1* | 9/2007 | Lukis | G06T 19/20 345/653 |
| 2008/0024444 A1* | 1/2008 | Abe | G06F 3/0485 345/157 |
| 2009/0100366 A1* | 4/2009 | Fitzmaurice | G06F 3/04815 715/767 |
| 2010/0058227 A1 | 3/2010 | Danton | |
| 2010/0058228 A1* | 3/2010 | Park | G06F 3/0488 715/786 |
| 2010/0134425 A1* | 6/2010 | Storrusten | G06F 3/0488 345/173 |
| 2013/0326426 A1* | 12/2013 | Queric | G06F 3/04815 715/851 |
| 2014/0129990 A1* | 5/2014 | Xin | G06F 3/0425 715/849 |
| 2015/0015572 A1* | 1/2015 | Izumo | G06T 7/0012 345/419 |
| 2015/0177976 A1* | 6/2015 | Ionescu | G09G 5/346 715/786 |
| 2016/0134737 A1 | 5/2016 | Pulletikurty | |
| 2017/0185262 A1* | 6/2017 | Schmidt | G06F 3/0486 |
| 2017/0357402 A1* | 12/2017 | Wolters | G06F 3/04847 |
| 2018/0011628 A1* | 1/2018 | Kano | G06F 3/04845 |
| 2018/0059899 A1* | 3/2018 | Andersen | G06F 3/04883 |
| 2018/0174356 A1* | 6/2018 | You | G06T 15/20 |
| 2018/0255284 A1* | 9/2018 | Holzer | G06F 1/1694 |
| 2020/0050342 A1* | 2/2020 | Lee | G06F 17/16 |
| 2021/0248285 A1* | 8/2021 | Orsos Barrenechea | G02B 27/0103 |

OTHER PUBLICATIONS

Disclosed Anonymously, et al., "Method and System for Scroll Pattern Based File Orientation Change", ip.com Prior Art Database Technical Disclosure, IP.com No. IPCOM000242047D, Jun. 16, 2015, 3 pgs., <https://priorart.ip.com/IPCOM/000242047>.

Gellersen, et al., "Multi-Sensor Context-Awareness in Mobile Devices and Smart Artifacts", ResearchGate, DOI: 10.1023/A:1016587515822, Oct. 2002, 18 pgs., <https://www.researchgate.net/publication/220134157_Multi-Sensor_Context-Awareness_in_Mobile_Devices_and_Smart_Artifacts>.

Ishak, et al., "Content-aware Scrolling", ResearchGate, Oct. 2006, 5 pgs., Columbia University, Department of Computer Science, New York, NY, DOI:10.1145/1166253.1166277,<https://www.researchgate.net/publication/220877045_Content-aware_scrolling>.

Johnson, et al., "Multi-Directional Scroll Method for Navigating in a Seemingly Boundless Three Dimensional Area", ip.com Prior Art Database Technical Disclosure, IP.com No. IPCOM000105948D, Mar. 20, 2005, 5 pgs., <https://priorart.ip.com/IPCOM/000105948>.

Munnelly, J., "Context Awareness in Mobile Phone Based Applications Using Bluetooth", A Dissertation submitted to the University of Dublin, 2005, 102 pgs., <https://www.scss.tcd.ie/publicalions/tech-reports/reports.05/TCD-CS-2005-79.pdf>.

Najafian, et al., "Context-aware User Interaction for Mobile Recommender Systems", UMAP 2016, 10 pgs., <http://ceur-ws.org/Vol-1618/HAAPIE_paper2.pdf>.

* cited by examiner

GRAPHIC DEVICE FOR CONTROLLING DISPLAYED OBJECT MOVEMENT AND/OR SCREEN SCROLLING

BACKGROUND

The present invention relates generally to the field of user navigation through a computer display and/or user control of movement within a computer display.

Human user control of displayed objects in a computer display is known. For example, arcade style video games in the early 1980s typically included joysticks that were configured so that movement of the joystick would control the movements and/or other actions of a displayed object on the video display of the arcade machine. For example, in one popular game, the displayed object whose movements were controlled by the joystick took the form of a yellow circle with an opening and closing "mouth" which "eats" dots as a primary mission of the game. Somewhat later, mouse devices became a popular way of moving a displayed object called a cursor. A cursor is one form of what will herein be called a "graphic device" because its primary purpose is to facilitate receiving input from human users. Somewhat later, touchscreen devices allowed users to move displayed objects, such as cursor type graphic devices, by making gestures on or near the displayed object.

It is known that touchscreen graphic devices can control parameters other than displayed objects. One familiar example of this would be a displayed object in the form of a slider that can be controlled by a human user's gestures to make the touchscreen display brighter or dimmer. In this example, the graphic device controls an aspect of the display itself, an aspect other than displayed object movement. Another example would be a displayed object in the form of a virtual thermostat that is controlled by a human user's gestures to make the room warmer or cooler—that is, the slider controls a real world heating and cooling system. In this example, manipulation of the graphic device is not controlling any aspect of the display at all.

In some cases, it is not a discrete displayed object that is moved by the user, but, rather, the computer display as a whole. This is known as "scrolling." Typically scrolling involves a virtual display that is larger than the display screen, such that scrolling allows the human user to see various portions of the larger virtual display over time. An example of this would be a virtual display of a ten page word processing document, where the screen and scrolling are such that only half of a page of the ten page document can be seen on the display at any given time—users scroll "up" and "down" through the document while editing it.

SUMMARY

According to an aspect of the present invention, there is a method, computer program product and/or system that performs the following operations (not necessarily in the following order): (i) generating a first display data set including information indicative of a first display including: (a) a selected object, and (b) a graphic device that includes a plurality of independently operable active areas, with each active area corresponding to motion in a different direction; (ii) receiving a user input data set including information indicative of a gesture input made by a user on a first active area of the plurality of active areas; and (iii) generating a second display data set including information indicative of a second display where the selected object is moved, relative to its location in the first display, in a first direction corresponding to the first active area of the graphic device.

According to an aspect of the present invention, there is a method, computer program product and/or system that performs the following operations (not necessarily in the following order): (i) generating a first display data set including information indicative of a first display including a graphic device that includes a plurality of independently operable active areas, with each active area corresponding to motion in a different display scrolling direction; (ii) receiving a user input data set including information indicative of a gesture input made by a user on a first active area of the plurality of active areas; and (iii) generating a second display data set including information indicative of a second display where second display has been scrolled, relative to the first display, in a first direction corresponding to the first active area of the graphic device.

According to an aspect of the present invention, there is a method, computer program product and/or system that performs the following operations (not necessarily in the following order): (i) generating a first display data set including information indicative of a first display including a graphic device that includes a plurality of independently operable active areas, with each active area corresponding to a different operational parameter of a controlled device; (ii) receiving a user input data set including information indicative of a gesture input made by a user on a first active area of the plurality of active areas; and (iii) responsive to the receipt of the user input, controlling a first operational parameter of the controlled device based on the gesture input.

DETAILED DESCRIPTION

Figure 1:
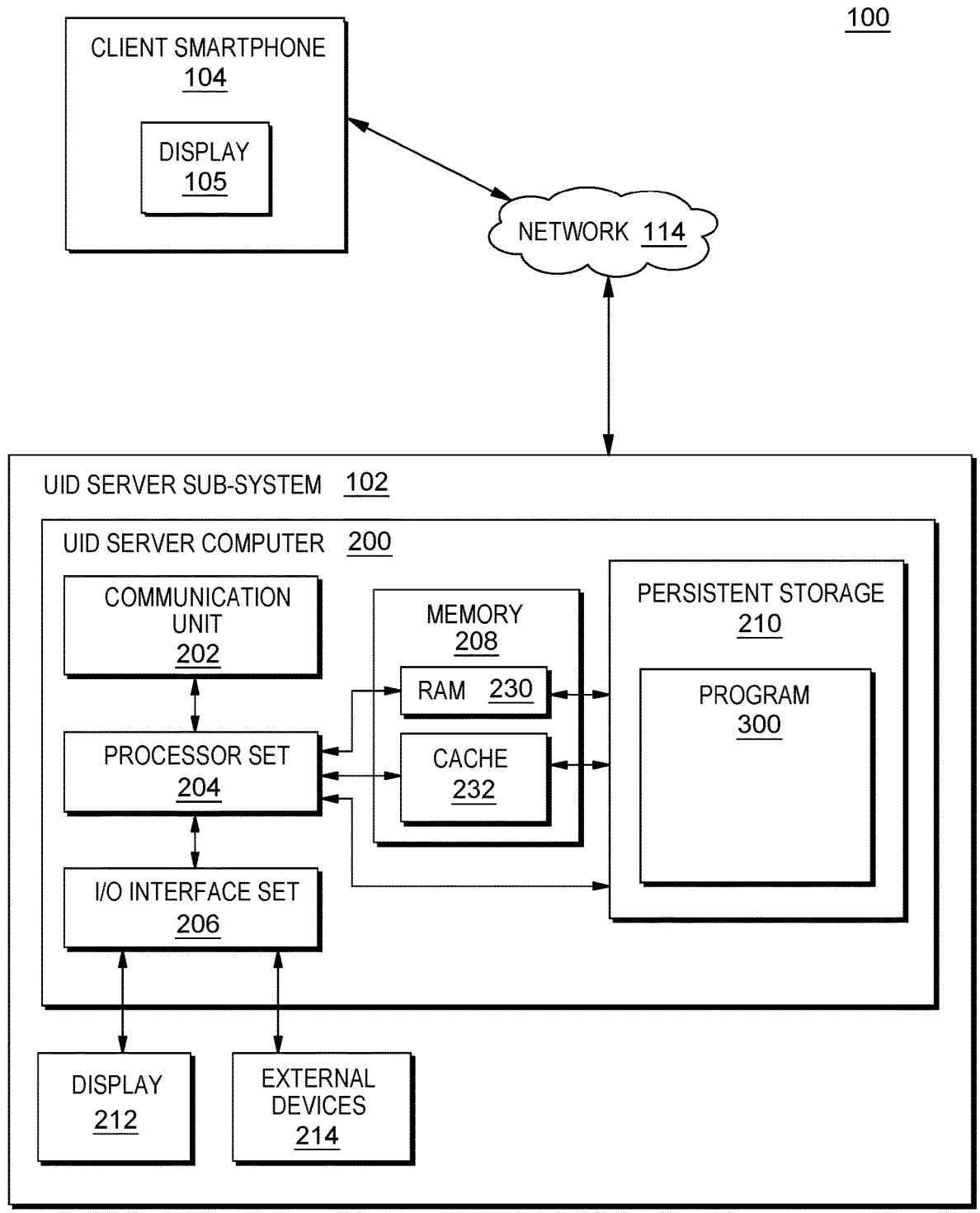
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: UID (user interface device) server subsystem 102 (sometimes herein referred to, more simply, as subsystem 102); client smartphone 104 (including display 105); and communication network 114. UID server subsystem 102 includes: UID server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with UID server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
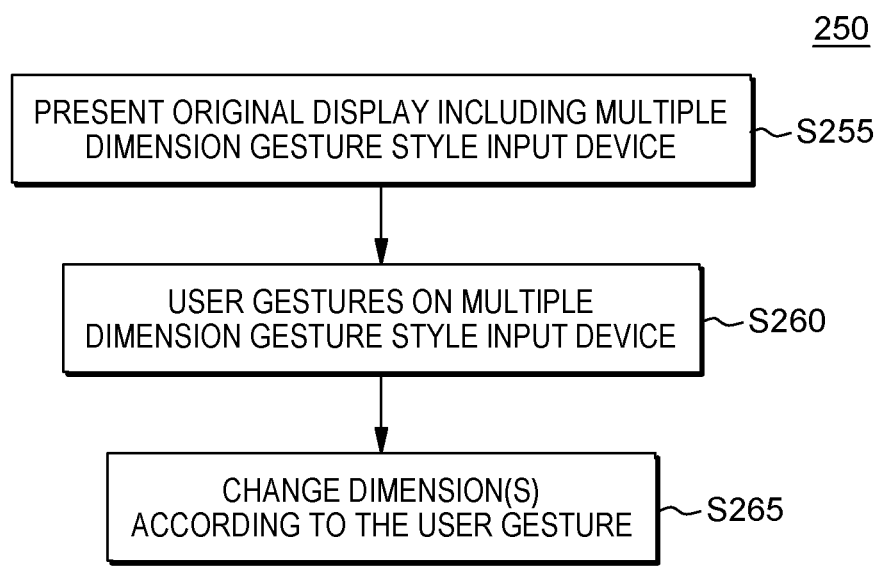
FIG. 2 is a flowchart showing a first embodiment method performed, at least in part, by the first embodiment system.
Figure 3A:
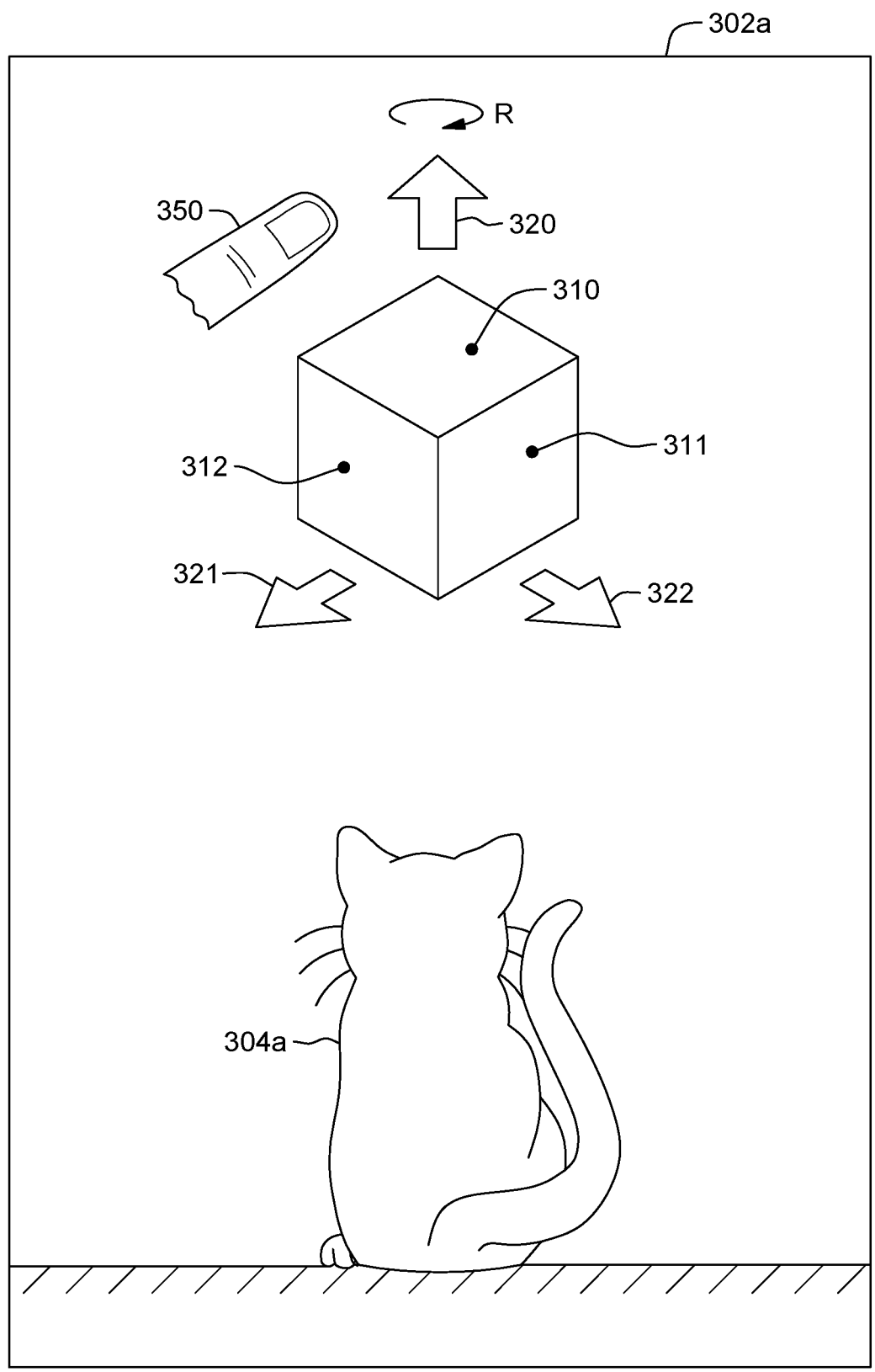
FIG. 3A is a first screenshot generated by the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where program 300 of UID server subsystem 102: (i) generates a first display data set corresponding to a first display; and (ii) sends this first display to client smartphone 104 to be displayed on display 105. The display corresponding to the first display data set is shown as screenshot 302a of FIG. 3A. The display includes: (i) the image of a house cat 304a; and (ii) embodiment of a graphic device 310, 311, 312, 320, 321, 322 according to the present invention. The graphic display device includes multiple active areas 310, 311, 312, 320, 321, 322. Each of the active areas can be independently activated and operated by a user gesture (see fingertip 350) on the touchscreen style display 105. Each active area controls a different "dimension" as will be further explained in connection with subsequent operations of flowchart 250. The machine logic in this distributed embodiment is located on a device (that is, UID server computer 200) which is separate and remote from display 105. Alternatively, the operative machine logic according to various embodiments of the present invention may be located in the same device as the display (which, in this example, would be client smartphone 104).

Processing proceeds operation S260, where the user's gesture input on graphic device 310, 311, 312, 320, 321, 322 is received by program 300 through touchscreen style display 105, client smartphone 104 and network 114. The user can make six different operative gestures on the six different active areas of the graphic device to achieve the following responsive results: (i) linear motion gesture starting from active area 310 in order to translate a selected object up or down; (ii) linear motion gesture starting from active area 311 in order to translate a selected object in the direction shown by the arrow labelled by reference numeral 322; (iii) linear motion gesture starting from active area 312 in order to translate a selected object in the direction shown by the arrow labelled by reference numeral 321; (iv) rotational motion gesture starting from active area 320 (see rotational direction arrow R in FIG. 3A) in order to rotate a selected object in a rotational direction about an axis defined by the arrow labelled by reference numeral 320; (v) rotational motion gesture starting from active area 321 in order to rotate a selected object in a rotational direction about an axis defined by the arrow labelled by reference numeral 321; and (vi) rotational motion gesture starting from active area 322 in order to rotate a selected object in a rotational direction about an axis defined by the arrow labelled by reference numeral 322. In this example, the user (see fingertip 350) chooses to make a rotational gesture starting from active area 320 of the graphic device, and that information is sent to program 300.

In this example, each of the six dimensions, respectively corresponding to the six independently operable active areas of the display device, is a direction of physical location/motion for an object in the display (in this example, house cat 304a, 304b). Alternatively, these six dimensions may be scrolling (see, Background section) directions to be applied to the display. Alternatively, these six dimensions may correspond to motions of real world objects (for example, directions of motion of a remote controlled aerial vehicle). Alternatively, the six dimensions may not correspond to object motion/object location at all (for example, dimensions respectively correspond to ambient temperature control, ambient humidity control, ambient light level, ambient sound level, room fragrance control, activation/deactivation of an Internet of Things style video camera). Alternatively, there may be fewer, or more, than six independent active areas on the graphic device, so long as there is more than one independent active area. In this embodiment, some of the active areas are spaced apart from other active areas. Alternatively, the active area may all be contiguous (see embodiments discussed in the next subsection of this Detailed Description section).

Figure 3B:
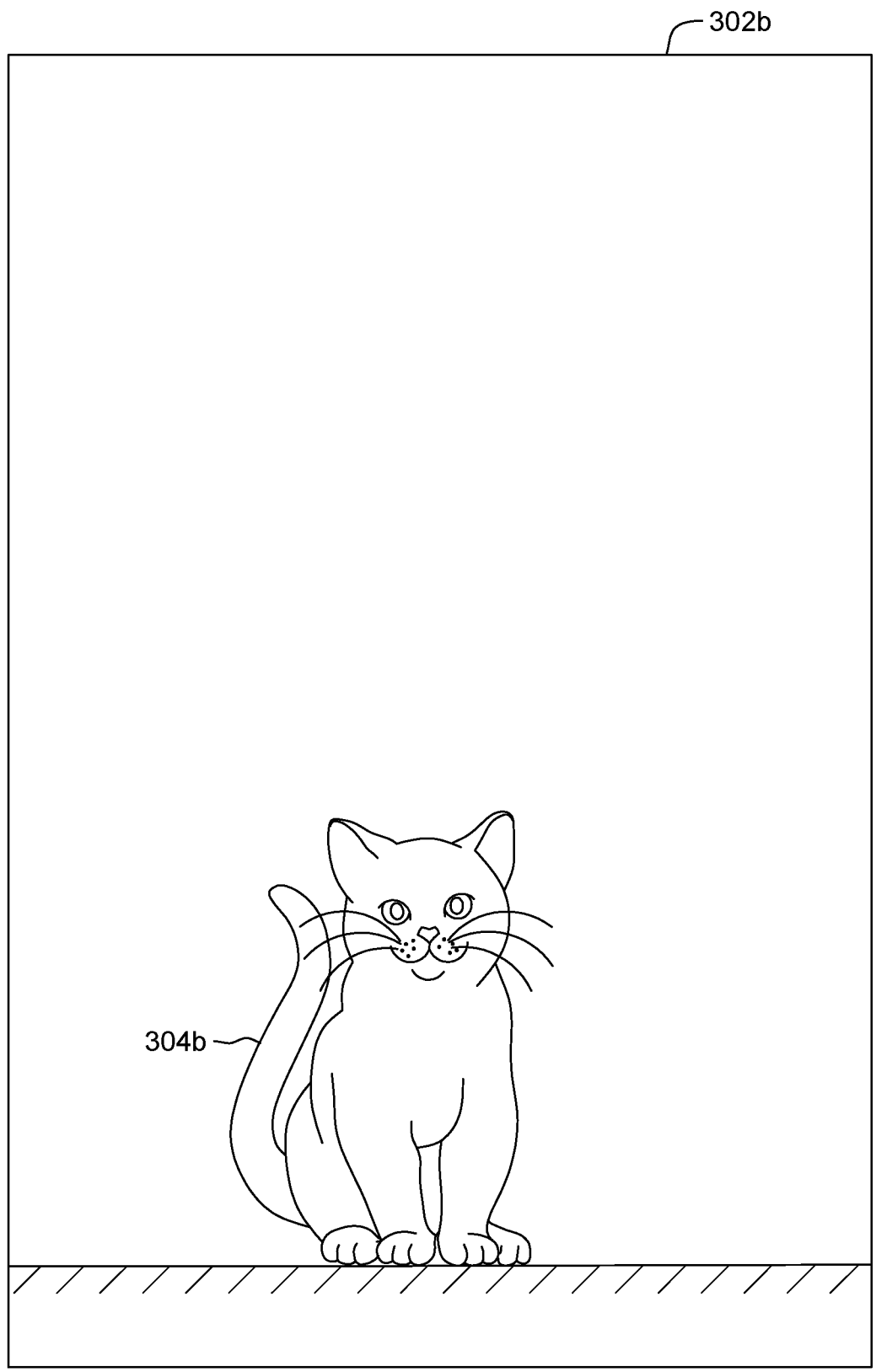
FIG. 3B is a second screenshot generated by the first embodiment system.
Figure 4A:
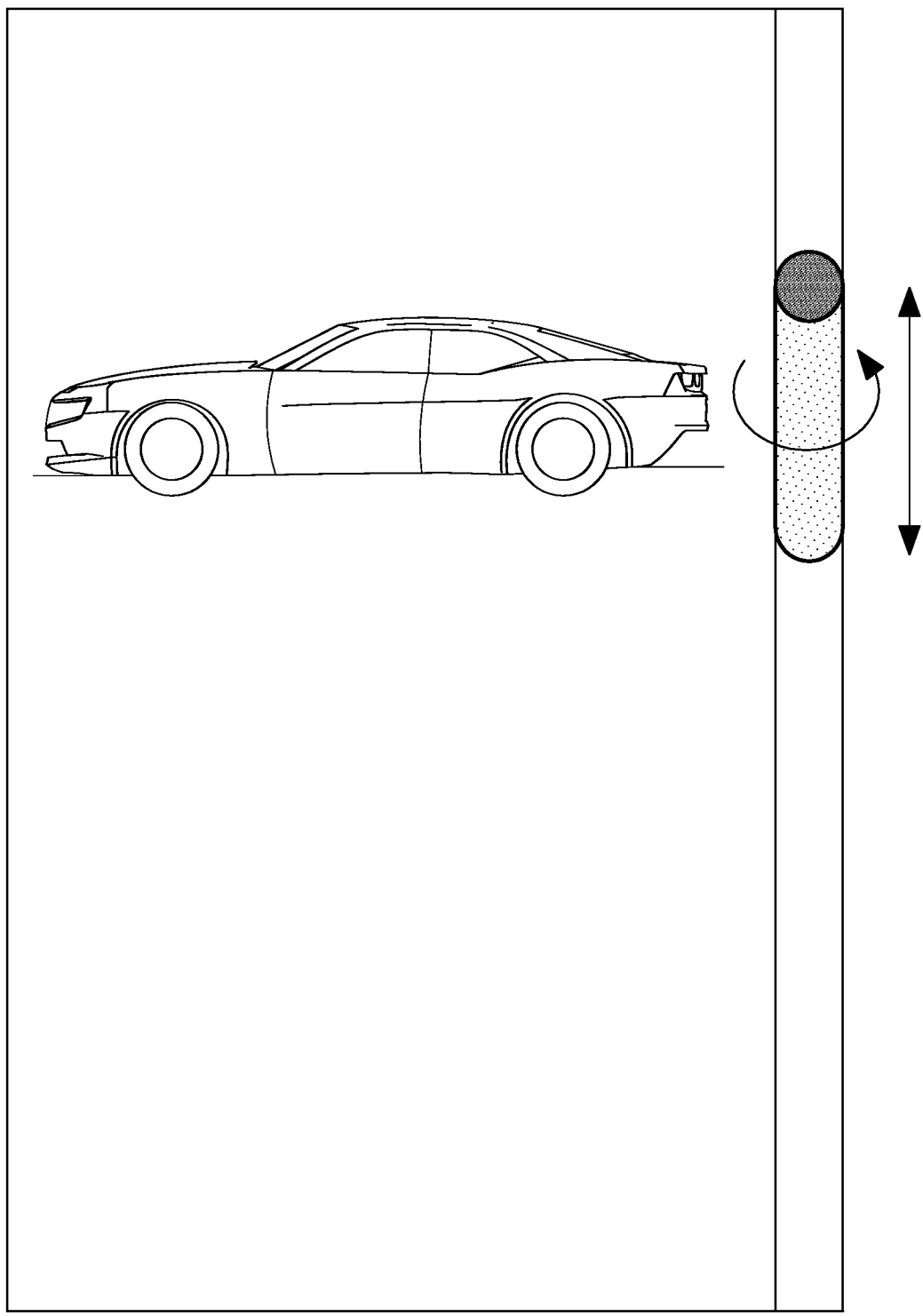
FIGS. 4A, 4B, 4C, 4D, 4E, 4F, 4G, 4H, 4I, 4J, 4K and 4L are each screenshots generated by an embodiment of the present invention.
Figure 4B:
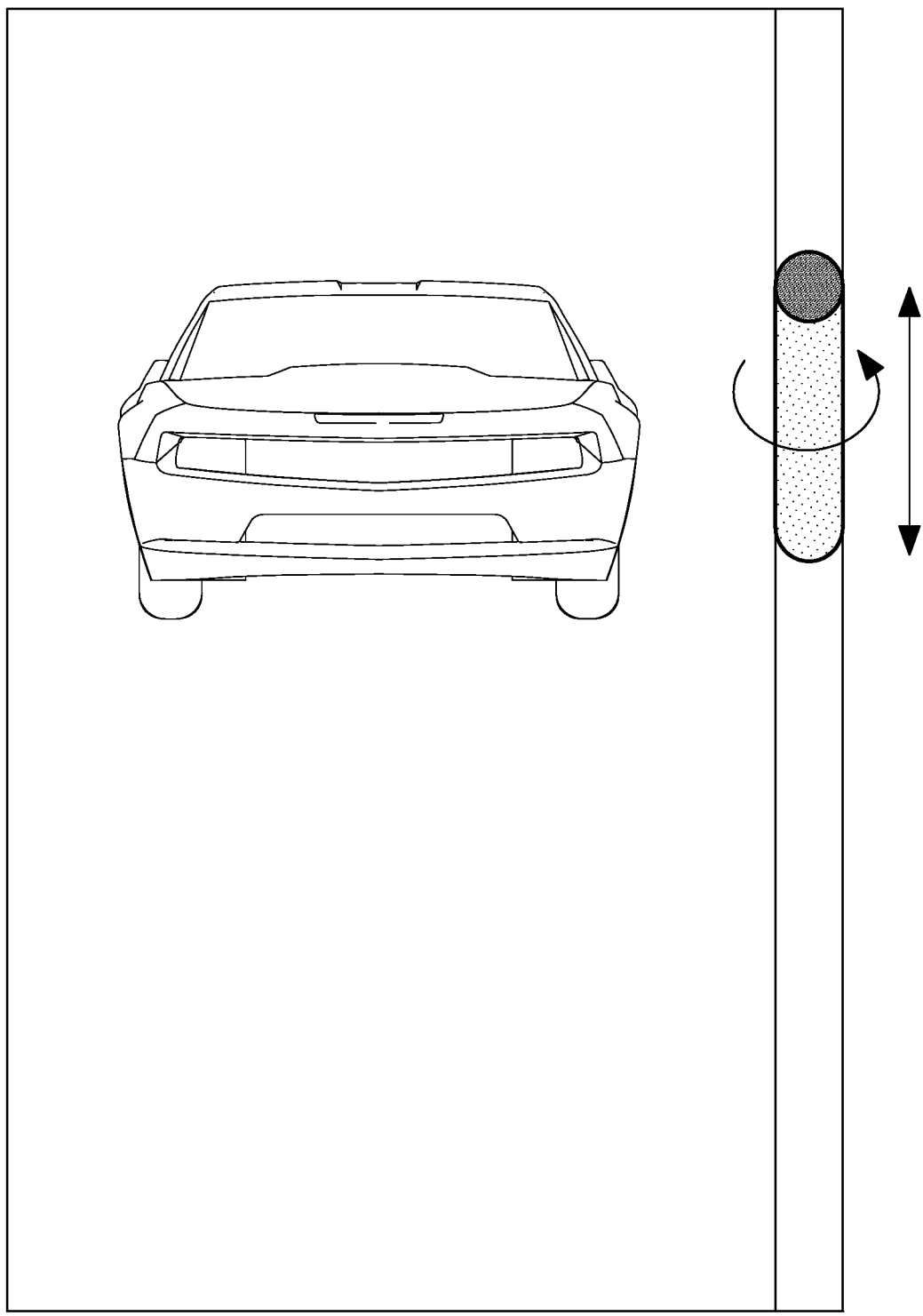
Figure 4C:
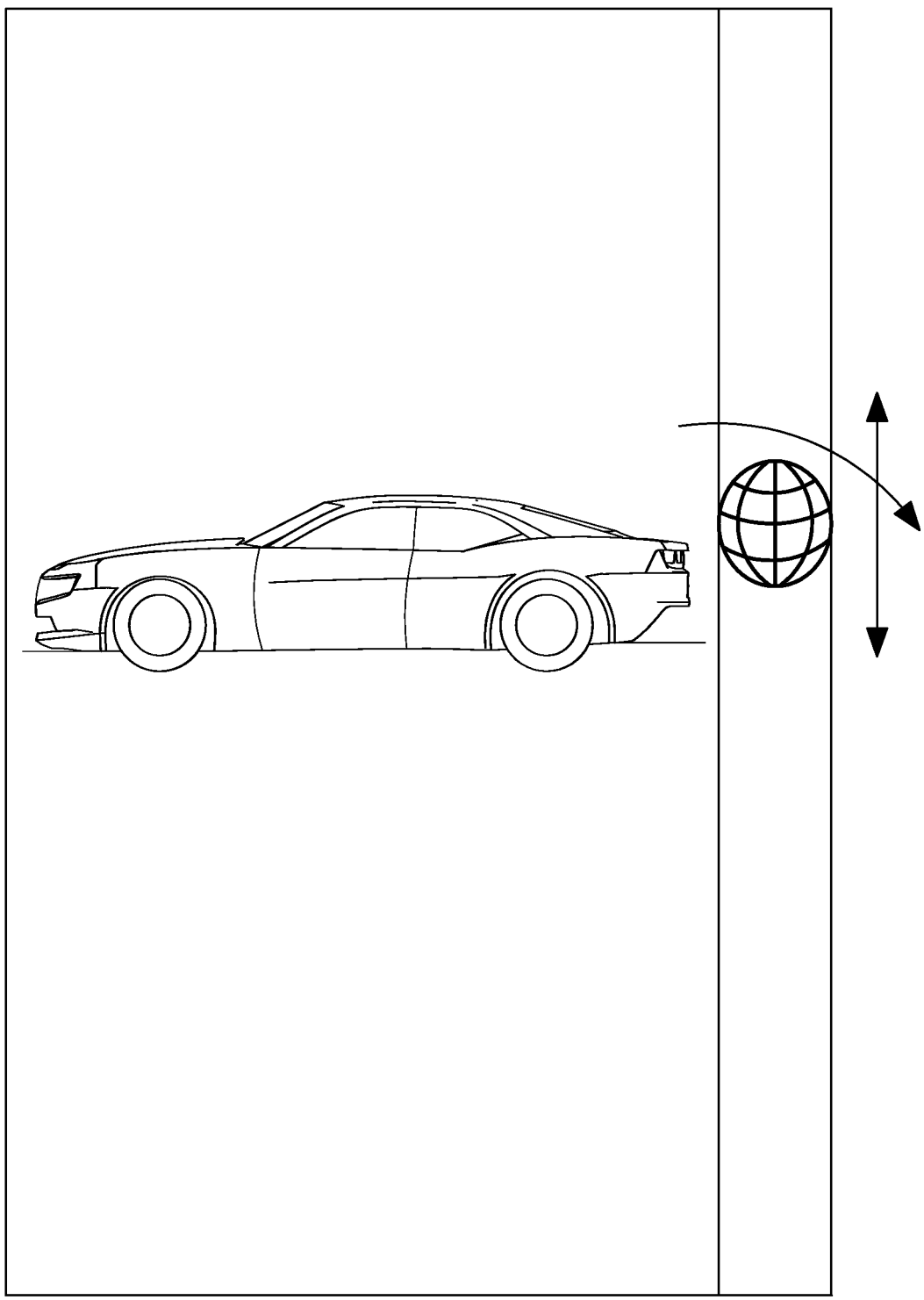
Figure 4D:
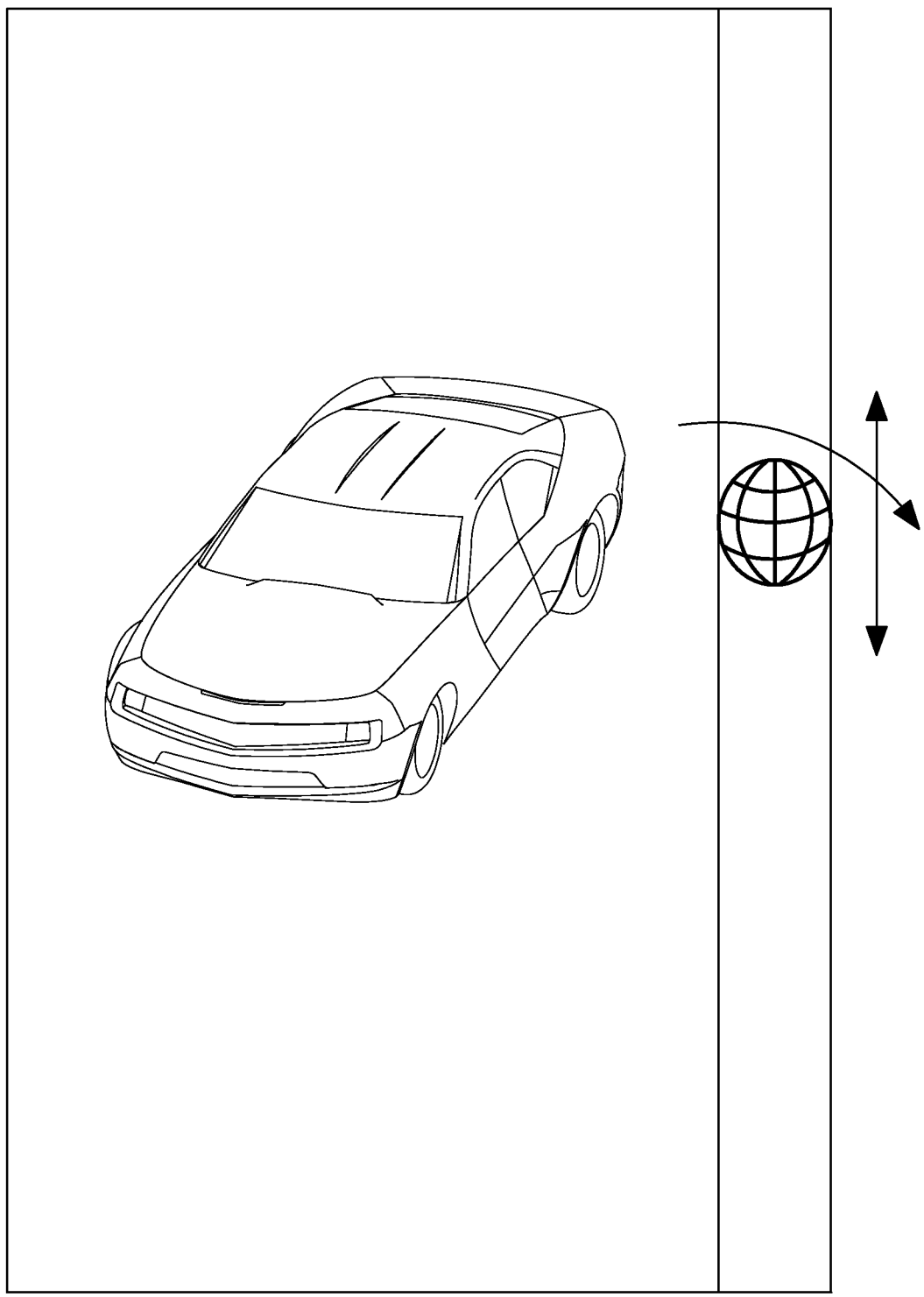
Figure 4E:
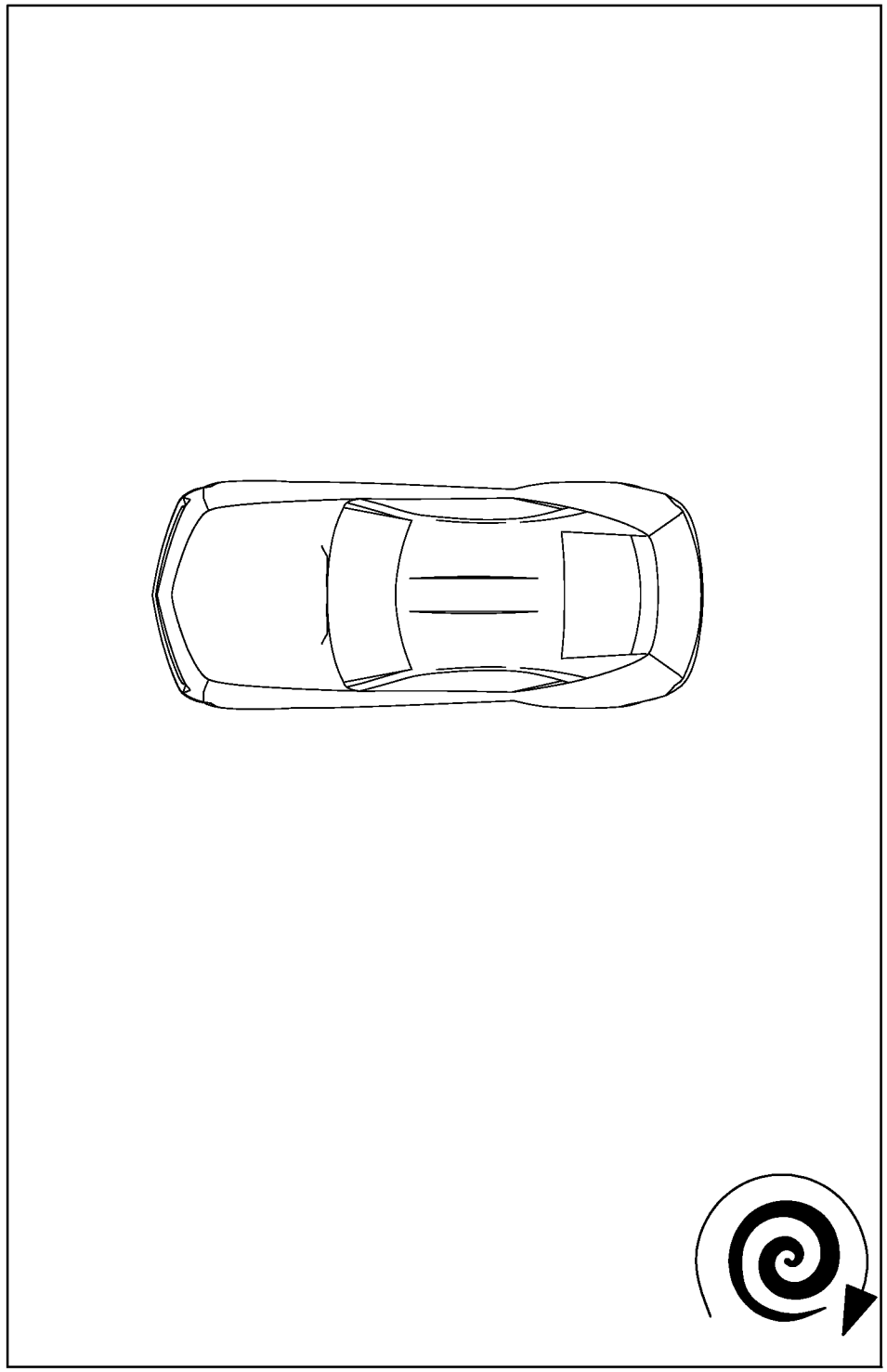
Figure 4F:
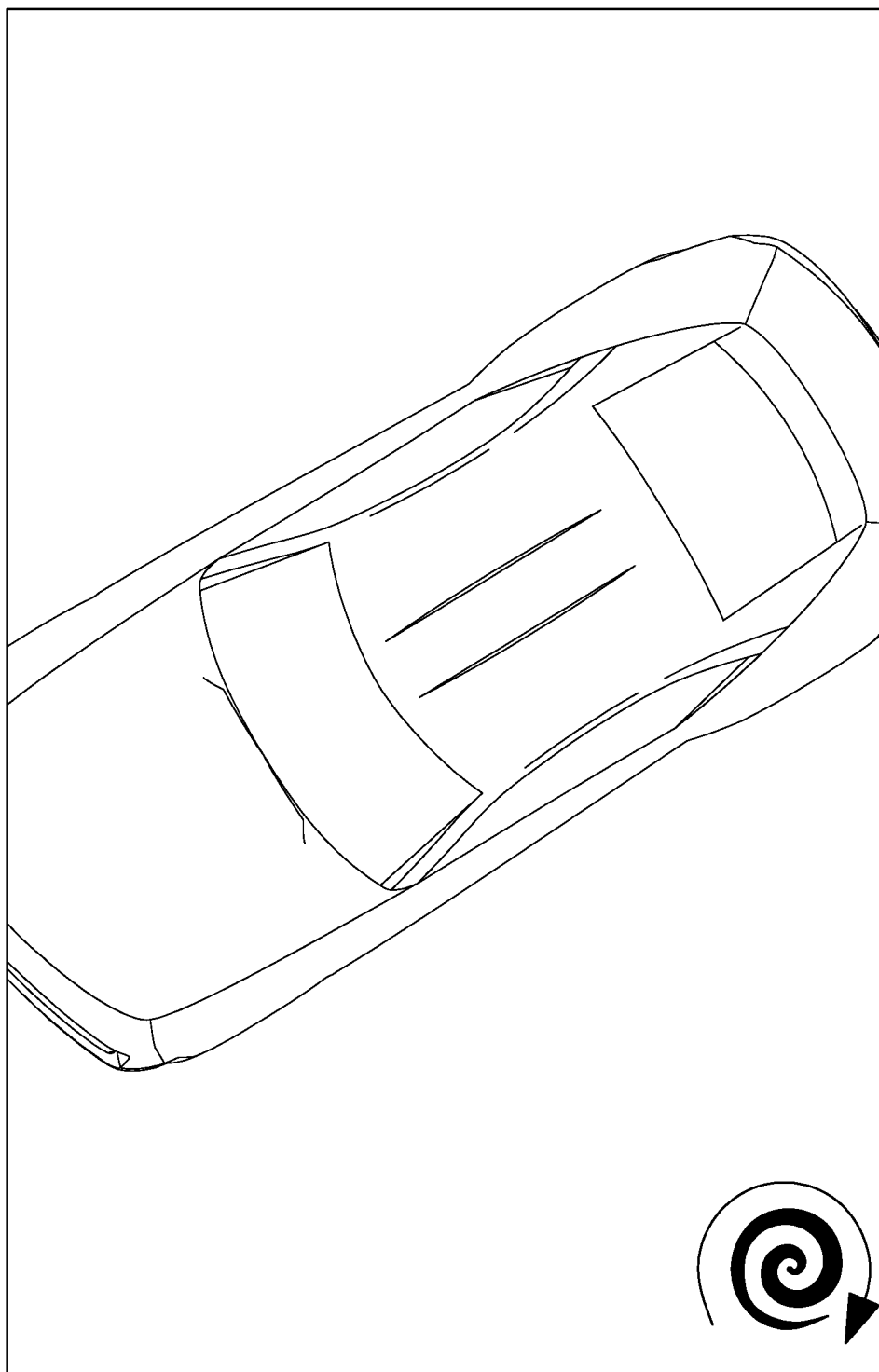
Figure 4G:
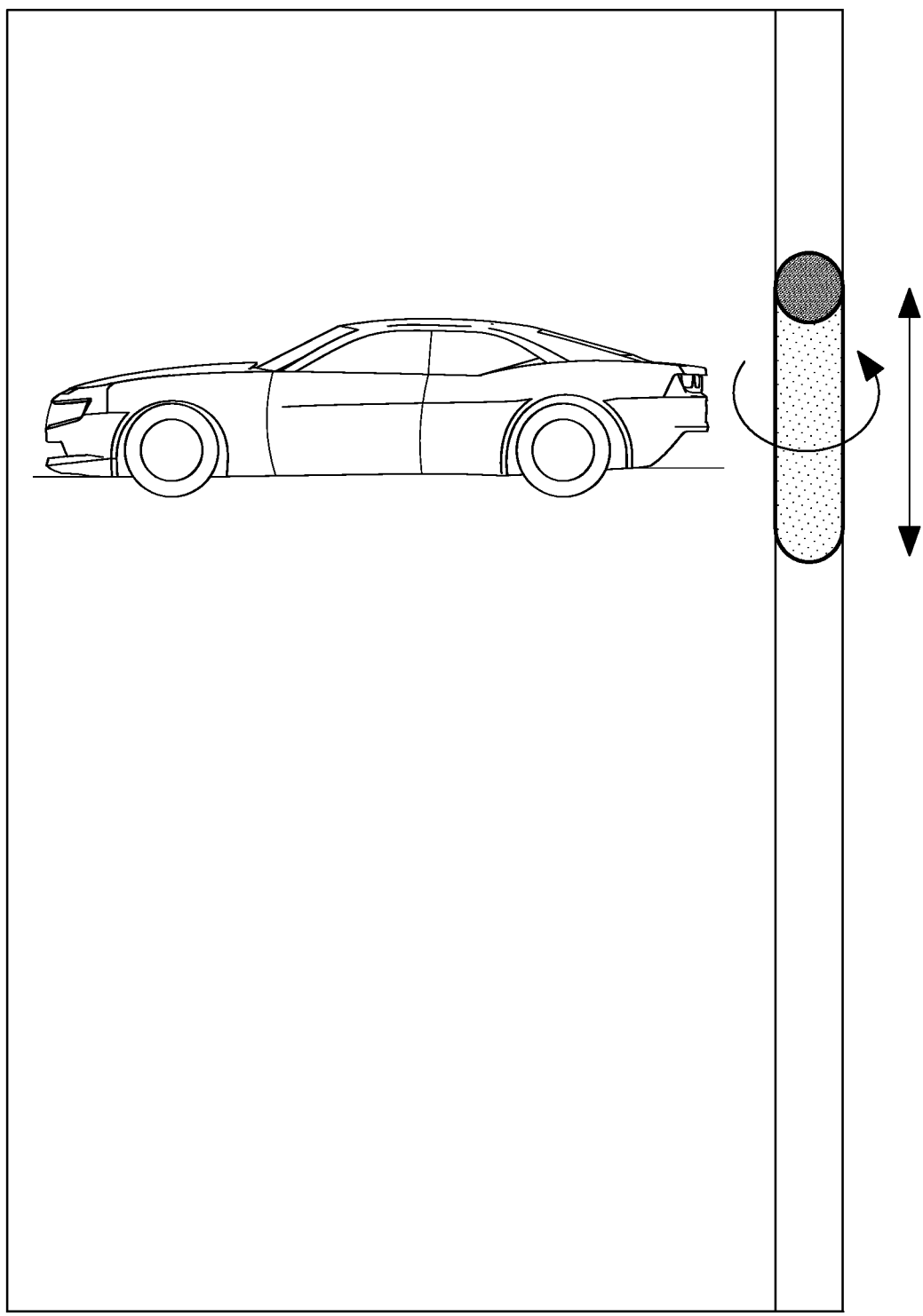
Figure 4H:
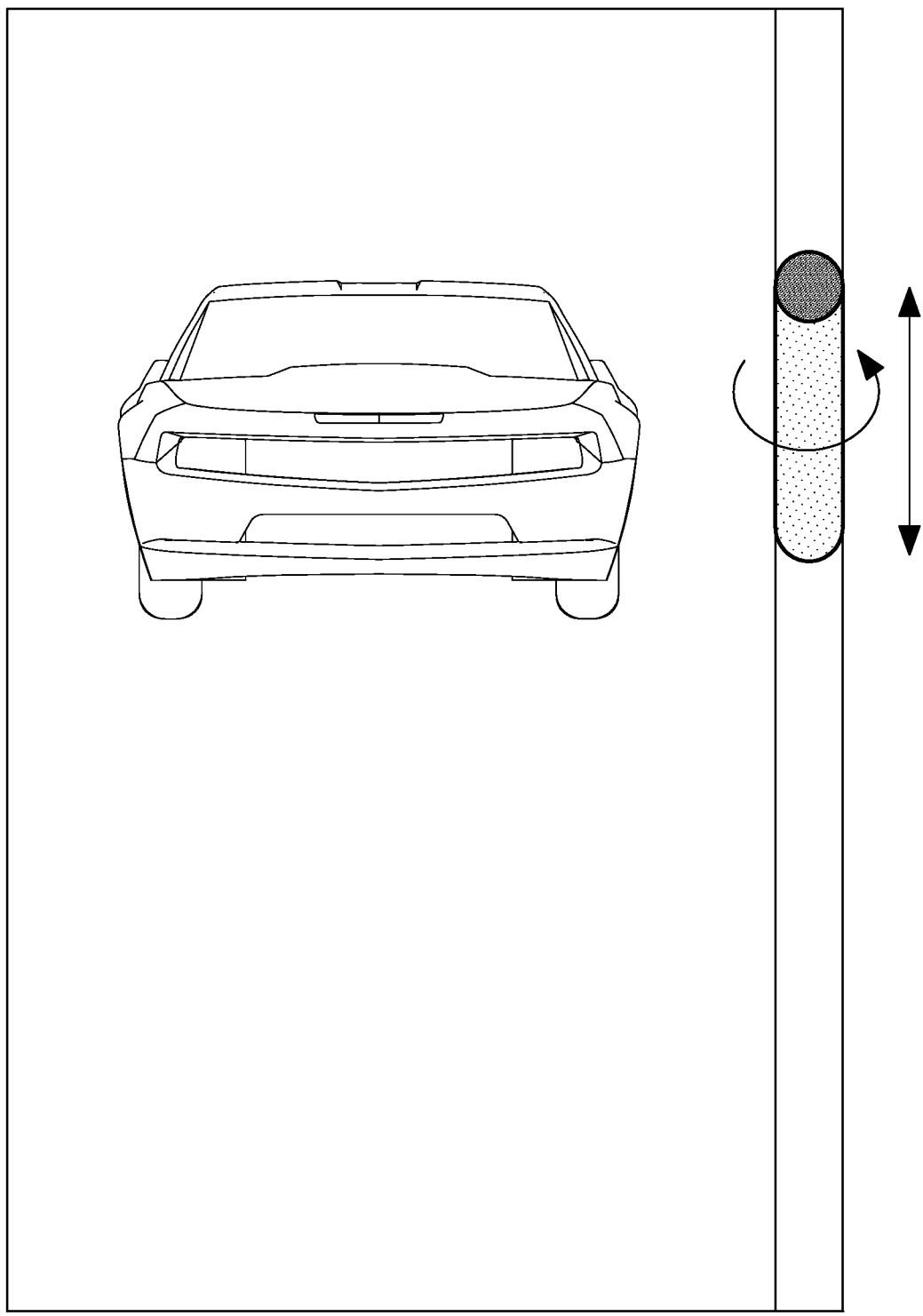
Figure 4I:
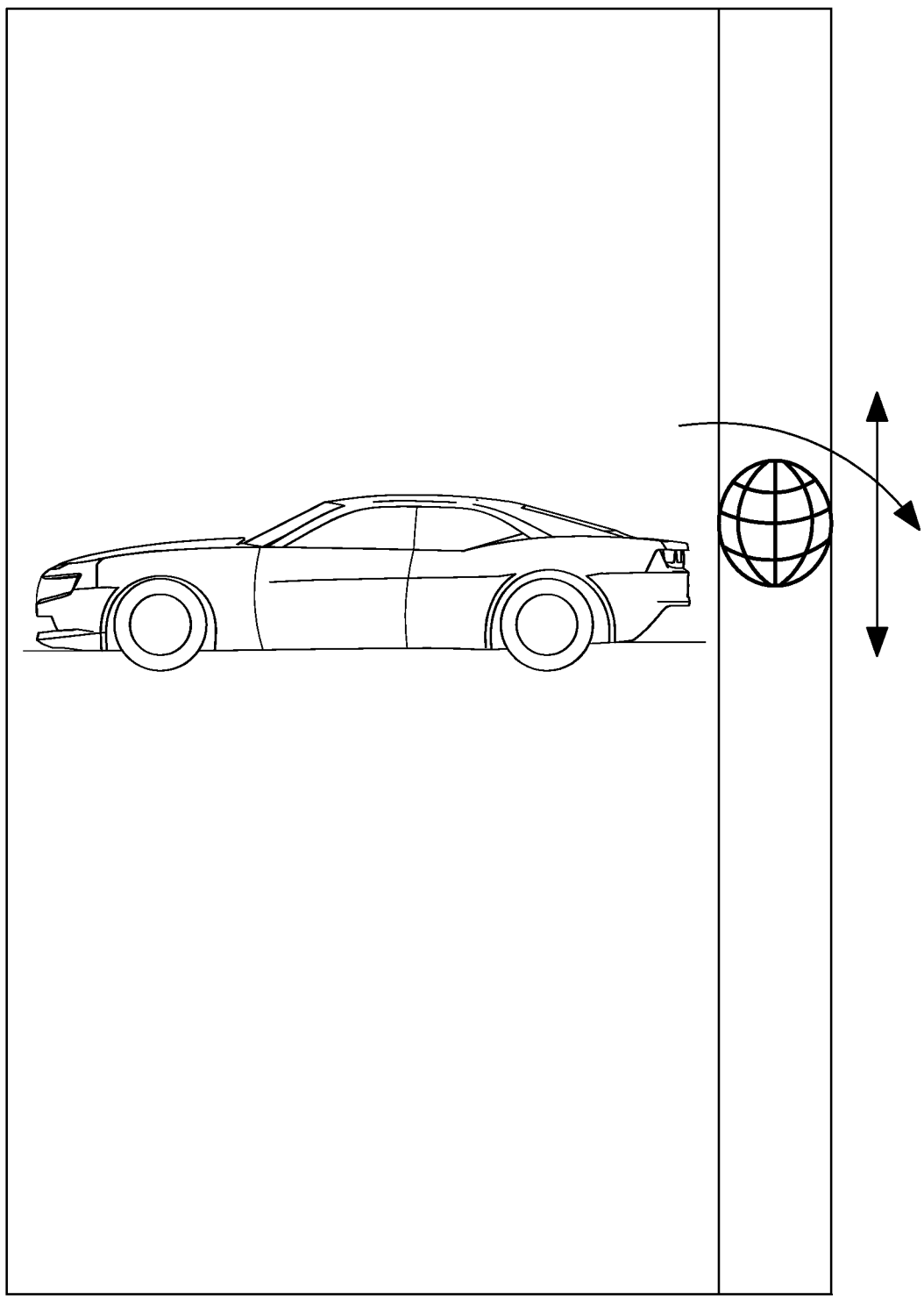
Figure 4J:
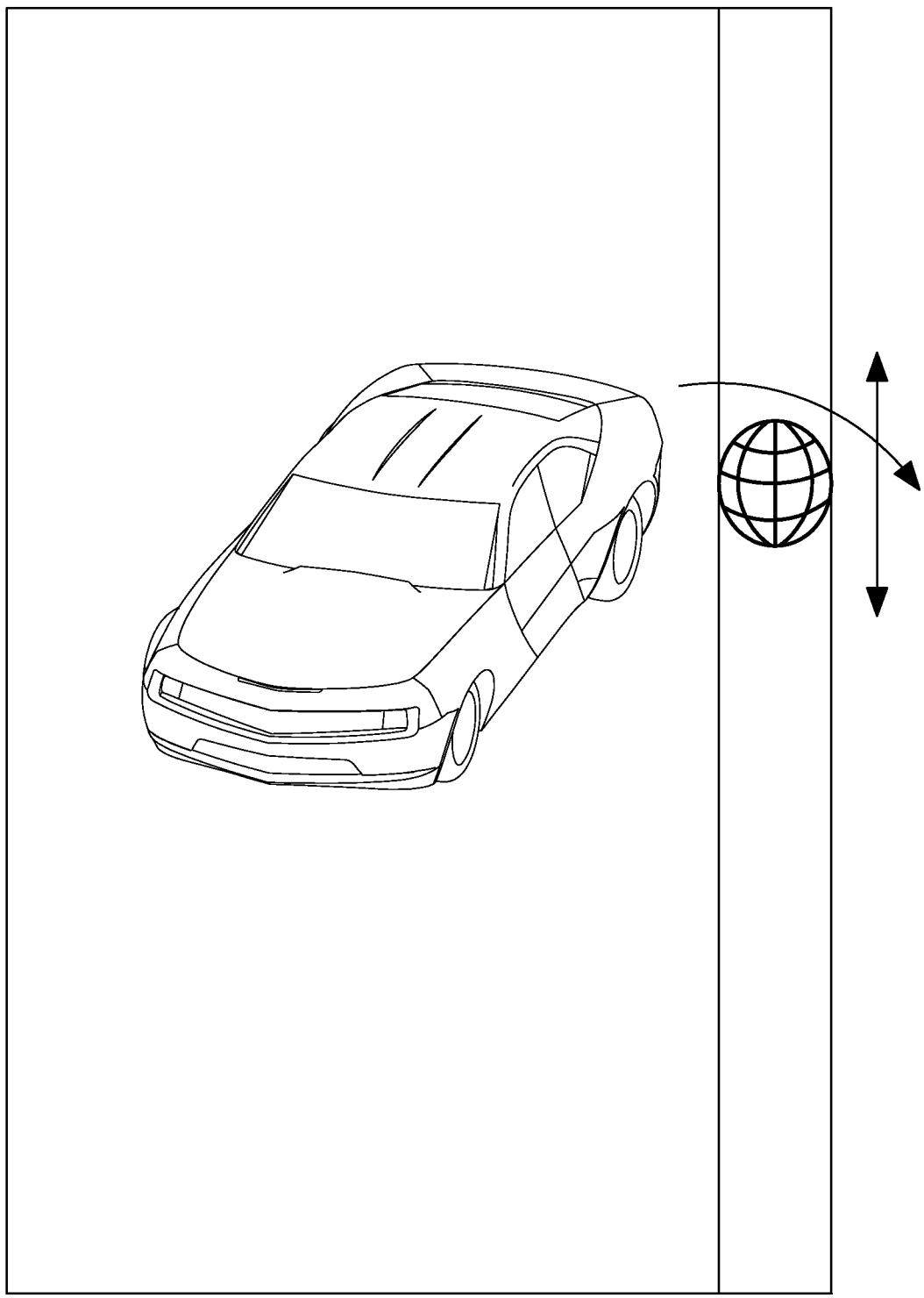
Figure 4K:
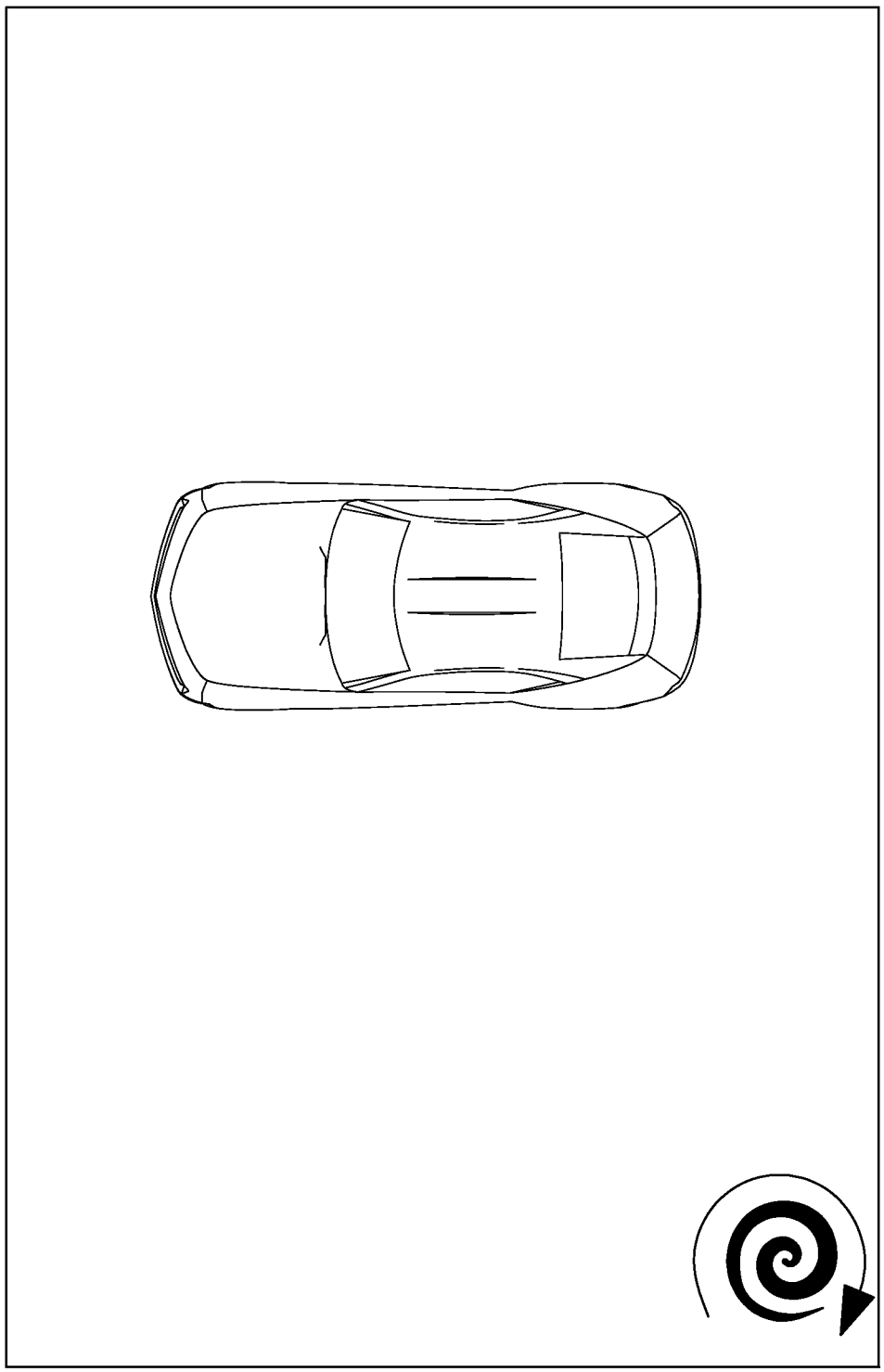
Figure 4L:
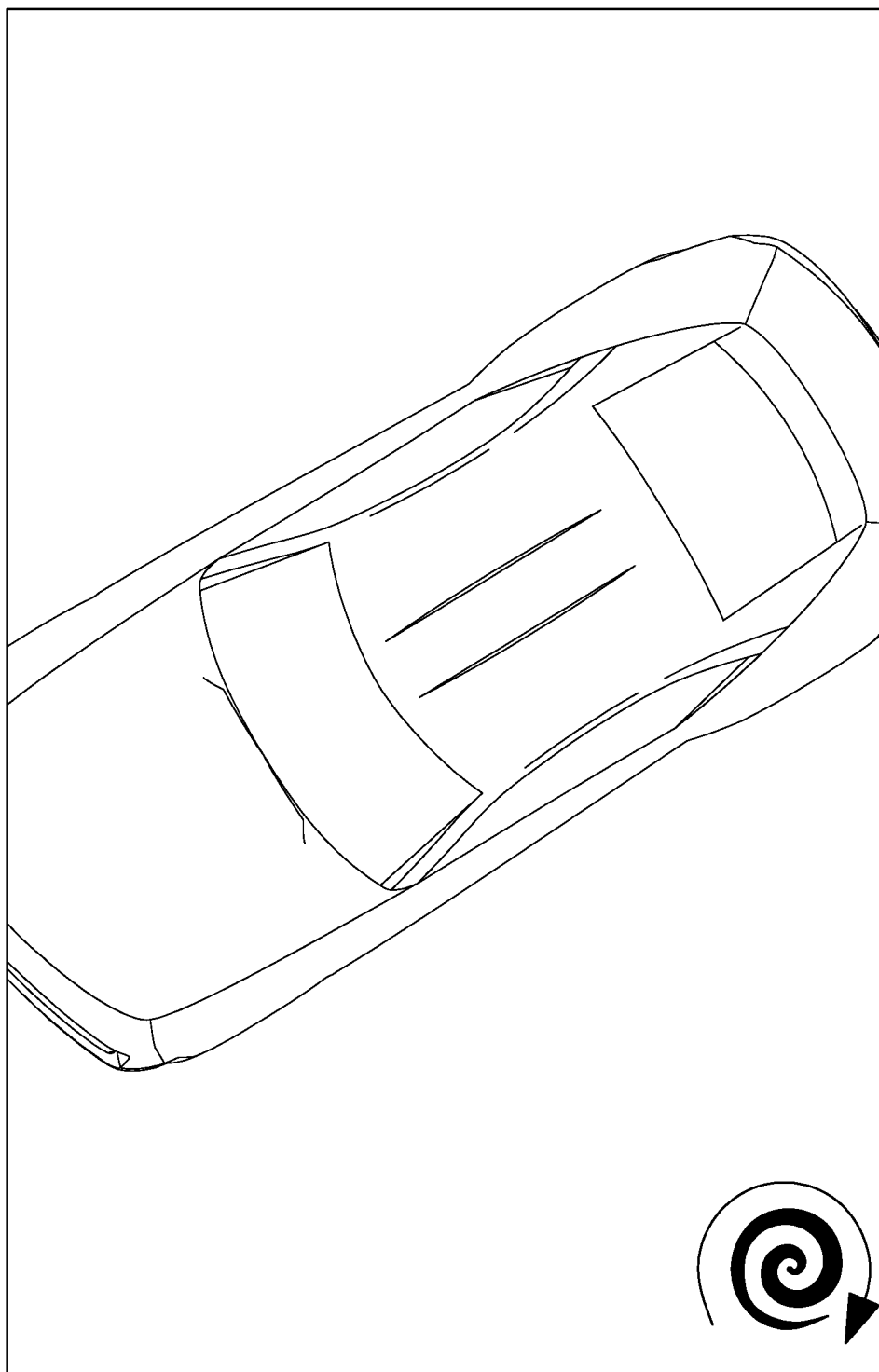

Processing proceeds to operation S265, where program 300: (i) generates a second display data set where house cat 304b has been rotated (as shown as screenshot 302b of FIG. 3B) according to the user's gesture starting from active area 320; and (ii) sends the second display data set to client smartphone 104 for display on display device 105. This second display is shown in FIG. 3B, where: (i) the graphic display is gone (until summoned again by the user); and (ii) house cat 304b has been rotated to face the viewer (that is, rotated about the axis in the direction defined by the arrow labelled with reference numeral 320).

III. Further Comments and/or Embodiments

Screenshots 400a, 400b, 400c, 400d, 400e, 400f, 400g, 400h, 400i, 400j, 400k and 400l (respectively corresponding to FIGS. 4A, 4B, 4C, 4D, 4E, 4F, 4G, 4H, 4I, 4J, 4K and 4L) show operation of other graphic devices, with multiple independently operable active areas, according to the present invention.

While interacting with any content, the user might need multi-directional scrolling, one content can have multiple dimensions, for example, a photographic album can be navigated based on time scale, now, and again for any selected year might want to navigate the photographs based on event etc. with existing scroll or progress bar, the user will be having difficulty to navigate the contents in multiple directions. In yet another example, wherein the user is trying to view parts of a 360 degree content like 360 degree video or panoramic photo, the user currently needs to tilt his phone or enable his phone in a VR (virtual reality) box or view in a VR apparatus to get the complete view of the content. There is a need for a method and system by which, based on the context of navigating of the content, types of media content, types of contents are to be navigated, user's predicted need etc. appropriate 3D scroll or progress bar will be created so that the user can perform multi-dimensional navigation with dynamically created appropriate 3D scroll or progress bar.

Some embodiments of the present invention may include one, or more, of the following operations, features, characteristics and/or advantages: (i) context aware 3D scroll or progress bar creation in any user interface; (ii) based on the context of navigating of the content, types of contents are to be navigated, user's predicted need, and so on, an appropriate 3D scroll or progress bar will be created, in a dynamic fashion based on this context information; and/or (iii) user uses the dynamically crated indicator in performing multi-dimensional navigation.

Some embodiments of the present invention may include one, or more, of the following operations, features, characteristics and/or advantages: (i) based on historical pattern of content navigation in different dimensions of the content, types of content displayed on the display device etc., the system will dynamically create the appropriate context relevant 3D scroll or progress bar; (ii) the user can navigate the contents in any axial direction and/or different dimensions with the 3D scroll bar; (iii) based on the types of content, user's content navigation history, volume of contents, overflowing content, user's predicted need based on the contextual situation etc., the system will dynamically decide what types of 3D scroll or progress bar is to be created; (iv) some possible different types of scroll/progress bar geometries are as follows: spherical, cylindrical, cylindrical with a series of rotating barrel on the body of cylindrical scrollbar, rectangular bar; (v) while creating the 3D scroll or progress bar, the system will dynamically show the axis of rotation or direction of navigation; (vi) display of axis of rotation and direction of navigation allows a user to identify how the 3D scroll bar is to be navigated to navigate different dimensional contents; (vii) based on the types content and the user's navigation pattern, the system can create a combination of multiple shaped 3D scroll bars in a single scroll bar; (viii) accordingly the user can navigate the content where the content can be classified; and/or (ix) the classified content-based scroll bar will be created.

Some embodiments of the present invention may include one, or more, of the following operations, features, characteristics and/or advantages: (i) while navigating any content, the user can perform direction movement on the scroll bar; (ii) accordingly, the content can be navigated based on the directional rotation of the 3D shaped scroll bar portion; (iii) with the 3D scrollbar, the user can perform linear navigation and directional navigation of the content; (iv) based on the interactive 3D axial scrolling event, the system will be dynamically animating the content in a 3D direction with dynamic fitment, cropping, hiding of the content in the display real estate; (v) based on the predicted navigational need of the content; (vi) displays recommended directional navigation on the content and displays the same on the 3D scroll bar; (vii) provides for a system that is able to seamlessly integrate with 3D input accessories like stylus, 3D ball mouse, 3D trackpad, remote, joystick, gaming controllers; and/or (viii) controls the transitioning of multifarious scrolling functionality based on the type of scroll using the accessory embodiments or user interactions, such as gestures.

In some embodiments: (i) the indicator may be a shaped as a cylinder that is broken into segments along its axial direction; (ii) a user can virtually rotate each segment of the cylinder independently about the central axis of the cylinder, in a manner akin to a stack of independently rotatable knobs in an actual physical space; (iii) using these segmented cylinder embodiments, and based on the types of the content and the user's navigational need, the machine logic of the present invention will predict the number of dimensions required; and/or (iv) accordingly, a segmented cylinder style 3D scrollbar, along with the navigational direction, will be displayed on the display device that the user is using.

In some embodiments, the indicator is spherically shaped, and different controlled parameters are controlled when the user manipulates different portions of the spherical indicator. The spherical 3D scrollbar enables seamless viewing of 3D content, such as: (i) use of the indicator to scroll to different locations within a 360 degree video, (ii) use of an indicator to scroll to different portions of a display of a 360 degree photo, and/or (ii) single and multi-panoramic photos. Some embodiments allow the user to scroll the scroll bar about any axial direction.

Some embodiments of the present invention may include one, or more, of the following operations, features, characteristics and/or advantages: (i) the display device will be creating different types of 3D scroll bars based on the content and navigation pattern; (ii) the 3D shaped scroll bar can be circular cylindrical, square cylindrical, polynomial cylindrical, or spherical, etc.; (iii) will historically learn how the user interacts with different contents, how the user switches contents or how the user drills down to different content, etc.; (iv) the display device will have a content analysis module; (v) the content analysis module will analyze what content is being viewed; (vi) based on historical learning, the mobile device will track the content navigation pattern of the user; (vii) based on historical learning, the system will track the dimensional navigation pattern of the content; (viii) different 3D shapes can have different dimensions, such as a circular cross section can show multiple dimensions and a square cross section can show 4 dimensions; (ix) a spherical scrollbar can have multi-dimensional navigation; (x) the length of the scroll bar is controlled by the volume of the content, if the volume of the content is more than the length of the scroll bar will be more; and/or (x) while any content is opened and the user wants to navigate, then machine logic according to the present invention will analyze the content.

According to some embodiments of the present invention and based on the analysis of the content, (i) the system will identify possible dimensions of the content; (ii) the dimension of the contents can be metadata of the content and analysis detail of the content; (iii) while identifying the navigational need, the system will consider the user's current activity and what types of content the user is navigating; (iv) the mobile device will identify what types of dimension the user may be navigating while interacting with the content; (v) the system will classify the contents, and for each classified content, the system will identify the number of navigational dimensions; (vi) based on the predicted number of dimensions of the contents navigated, the system will identify the appropriate cross section; (vii) using the number of dimensional navigations, the system will identify how the 3D scroll bar is to be created; (viii) if the contents can be scrolled in multiple directions, then the system will be showing a spherical scroll bar; (ix) if the display device is having multiple segmented contents, and each segmented content is having different types of dimensions of navigation, then the system will create multiple shapes of a 3D scroll bar along with its length; (x) when the 3D scrollbar is created, the system will show the possible navigation direction, and the navigation direction will be shown with the 3D scrollbar portion; and/or (xi) based on the context of the activity, the system will recommend the direction of navigation of the scroll bar.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
    generating a first display data set including information indicative of a first display including: (i) a selected object, and (ii) a graphic device that includes a plurality of independently operable active areas, with: (a) a time-control active area corresponding to a time attribute, and (b) at least one motion-control active area respectively corresponding to motion in different direction(s);
    receiving a motion-control user input data set including information indicative of a gesture input made by a user on the at least one motion-control active area;
    generating a second display data set including information indicative of a second display where the selected object is moved, relative to its location in the first display, in a first direction corresponding to the gesture input made by the user;
    receiving a time-control user input data set including information indicative of a gesture input made by a user on the time-control active area of the plurality of active areas of the graphic device as shown in a third display; and
    generating a fifth display data set including information indicative of a fifth display where the time attribute is adjusted based on the gesture input made by the user on the time-control active area of the graphic device as shown in a fourth display;
    predicting, by machine logic, the user's needs for time and spatial manipulation of a video display; and
    creating, by machine logic, the graphic device, including spatial configurations of its at least one motion-control active area and its time-control active area.

2. The CIM of claim 1 wherein the graphic device is spherical in shape.

3. The CIM of claim 1 wherein the graphic device is cylindrical in shape.

4. The CIM of claim 1 wherein the first direction corresponds to translation in a linear direction.

5. The CIM of claim 1 wherein the first direction corresponds to rotational motion about a first axis.

6. A computer program product (CPP) comprising:
    a set of storage device(s); and
    computer code stored collectively and in a non-transitory manner in the set of storage device(s), with the computer code including data and instructions to cause a processor(s) set to perform at least the following operations:
        generating a first display data set including information indicative of a first display including: (i) a selected object, and (ii) a graphic device that includes a plurality of independently operable active areas, with: (a) a time-control active area corresponding to a time attribute, and (b) at least one motion-control active area respectively corresponding to motion in different direction(s),
        receiving a motion-control user input data set including information indicative of a gesture input made by a user on the at least one motion-control active area,
        generating a second display data set including information indicative of a second display where the selected object is moved, relative to its location in the first display, in a first direction corresponding to the gesture input made by the user,
        receiving a time-control user input data set including information indicative of a gesture input made by a user on the time-control active area of the plurality of active areas of the graphic device as shown in a third display, and
        generating a fifth display data set including information indicative of a fifth display where the time attribute is adjusted based on the gesture input made by the user on the time-control active area of the graphic device as shown in a fourth display;
    wherein the computer code further includes instructions for causing the processor(s) set to perform the following operation(s):
    predicting, by machine logic, the user's needs for time and spatial manipulation of a video display; and
    creating, by machine logic, the graphic device, including spatial configurations of its at least one motion-control active area and its time-control active area.

7. The CPP of claim 6 wherein the graphic device is spherical in shape.

8. The CPP of claim 6 wherein the graphic device is cylindrical in shape.

9. The CPP of claim 6 wherein the first direction corresponds to translation in a linear direction.

10. The CPP of claim 6 wherein the first direction corresponds to rotational motion about a first axis.

11. A computer system (CS) comprising:
    a processor(s) set;
    a set of storage device(s); and
    computer code stored collectively in the set of storage device(s), with the computer code including data and instructions to cause the processor(s) set to perform at least the following operations:
        generating a first display data set including information indicative of a first display including: (i) a selected object, and (ii) a graphic device that includes a plurality of independently operable active areas, with: (a) a time-control active area corresponding to a time attribute, and (b) at least one motion-control active area respectively corresponding to motion in different direction(s),
        receiving a motion-control user input data set including information indicative of a gesture input made by a user on the at least one motion-control active area,
        generating a second display data set including information indicative of a second display where the selected object is moved, relative to its location in the first display, in a first direction corresponding to the gesture input made by the user,
        receiving a time-control user input data set including information indicative of a gesture input made by a user on the time-control active area of the plurality of active areas of the graphic device as shown in a third display, and generating a fifth display data set including information indicative of a fifth display where the time attribute is adjusted based on the gesture input made by the user on the time-control active area of the graphic device as shown in a fourth display;

wherein the computer code further includes instructions for causing the processor(s) set to perform the following operation(s):

predicting, by machine logic, the user's needs for time and spatial manipulation of a video display; and creating, by machine logic, the graphic device, including spatial configurations of its at least one motion-control active area and its time-control active area.

12. The CS of claim 11 wherein the graphic device is spherical in shape.

13. The CS of claim 11 wherein the graphic device is cylindrical in shape.

14. The CS of claim 11 wherein the first direction corresponds to translation in a linear direction.

15. The CS of claim 11 wherein the first direction corresponds to rotational motion about a first axis.

* * * * *